Figure 1:
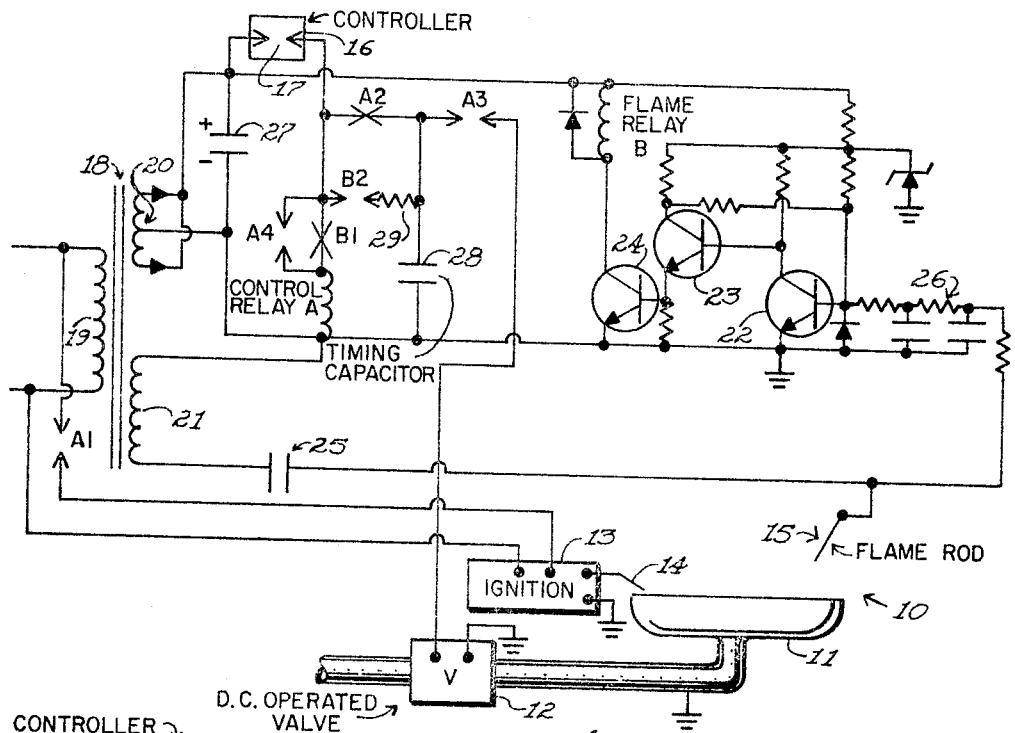

Sept. 6, 1966  B. H. PINCKAERS  3,270,799
BURNER CONTROL APPARATUS
Filed Dec. 7, 1964  3 Sheets-Sheet 1

INVENTOR.
BALTHASAR H. PINCKAERS
BY Francis A. Sim
ATTORNEY

United States Patent Office 3,270,799
Patented Sept. 6, 1966

3,270,799
BURNER CONTROL APPARATUS
Balthasar H. Pinckaers, Edina, Minn., assignor to Honeywell Inc., a corporation of Delaware
Filed Dec. 7, 1964, Ser. No. 416,280
9 Claims. (Cl. 158—128)

My invention is concerned with an improved burner control apparatus, and particularly my invention is concerned with a burner control apparatus which is constructed and arranged to provide safe and reliable control of a fuel burner installation wherein a fuel burner is directly ignited, as by a spark igniter. My invention is an improvement of a co-pending application Serial Number 416,320, filed December 7, 1964, wherein I am a joint inventor with Fred T. Deziel.

In the above-mentioned co-pending application a burner control apparatus is described wherein a charged timing capacitor is connected as the sole source of operating voltage for an electrically energizable, normally closed fuel valve to cause the valve to open and remain open only for a relatively short trial-for-ignition period. By the use of a charged capacitor, failure of the timing structure is impossible in that the valve operator must be operatively de-energized when the timing capacitor has become discharged. In the structure of the above-mentioned co-pending application the charge on the timing capacitor is maintained only if flame is established during the trial-for-ignition period.

My invention constitutes an improvement of the above described invention in that I provide a structure which insures that the timing capacitor is charged to a given level before the burner control apparatus is capable to switching the timing capacitor from its charging source to the valve, as the sole source of operating voltage for the valve. In this manner, a uniform trial-for-ignition time period is assured for each cycle of operation for the burner control apparatus. Furthermore, in the specific embodiment disclosed in the above-mentioned co-pending application, it is necessary to provide a continuous component checking flame detector whose output relay continuously cycles in the presence of flame. The structure of my invention utilizes a less expensive flame detector in which the flame relay does not cycle, but rather is switched from a static "no flame state" to a static "flame state" upon flame being detected. Furthermore, in the preferred embodiment of the invention disclosed in the above-mentioned co-pending application, it was necessary, in order to reset the device from a lock-out condition, to momentarily open the controller switch. I have originated a structure whereby the controller is initially effective to institute operation of the fuel burner unit, and if a subsequent flame failure places the burner control apparatus from the lock-out condition. In this manner plished by means of a manual reset switch located in the vicinity of the fuel burner installation, such that opening of the controller is not effective to reset the burner control apparatus for the lock-out condition. In this manner, personal attention to the fuel burner installation, by the operator, must accompany the resetting of the burner control apparatus from the safety lock-out condition.

Figure 2:
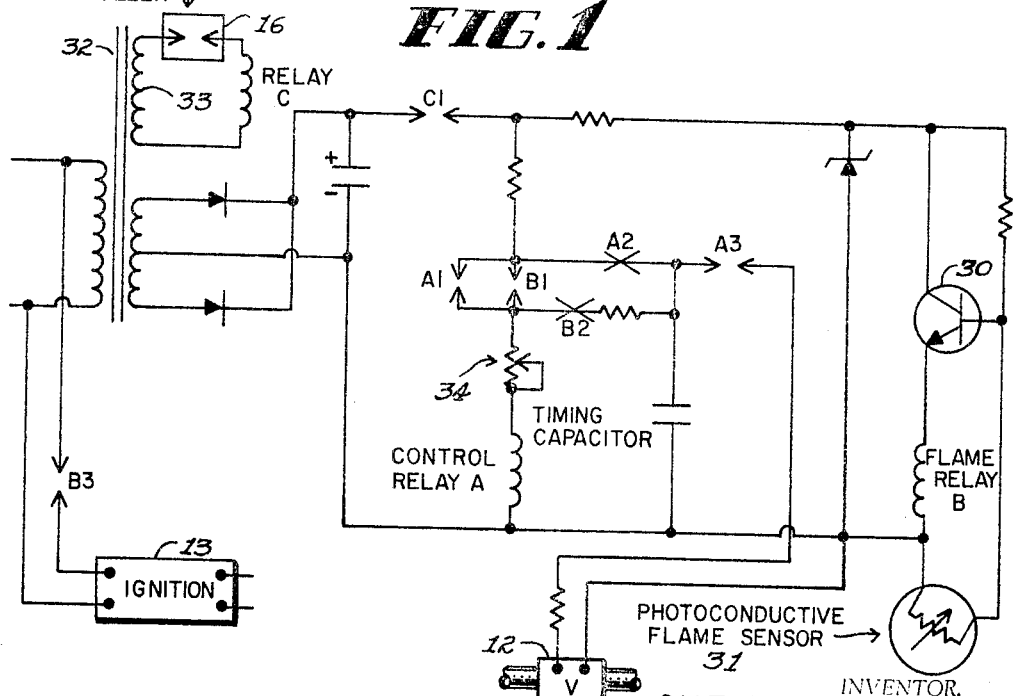
Figure 3:
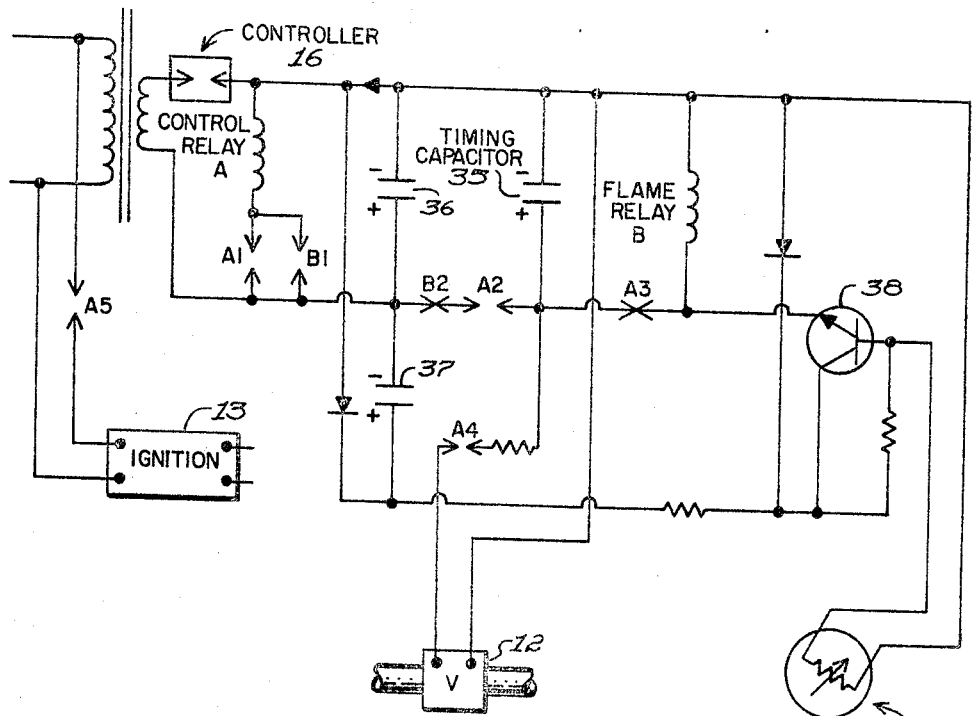
Figure 4:
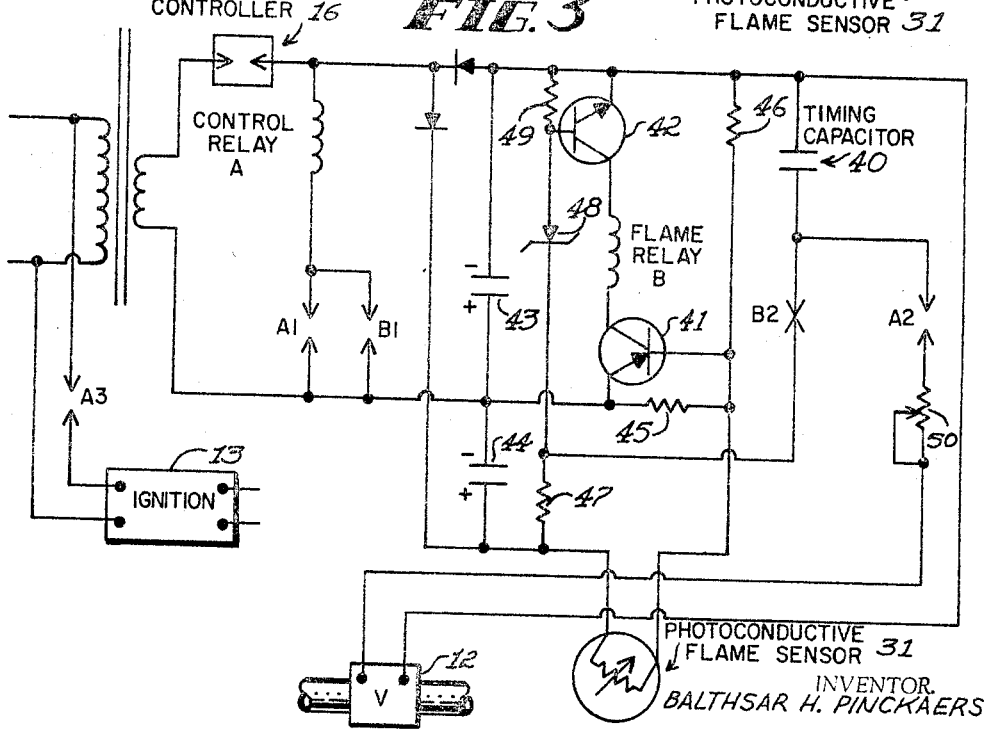
Figure 5:
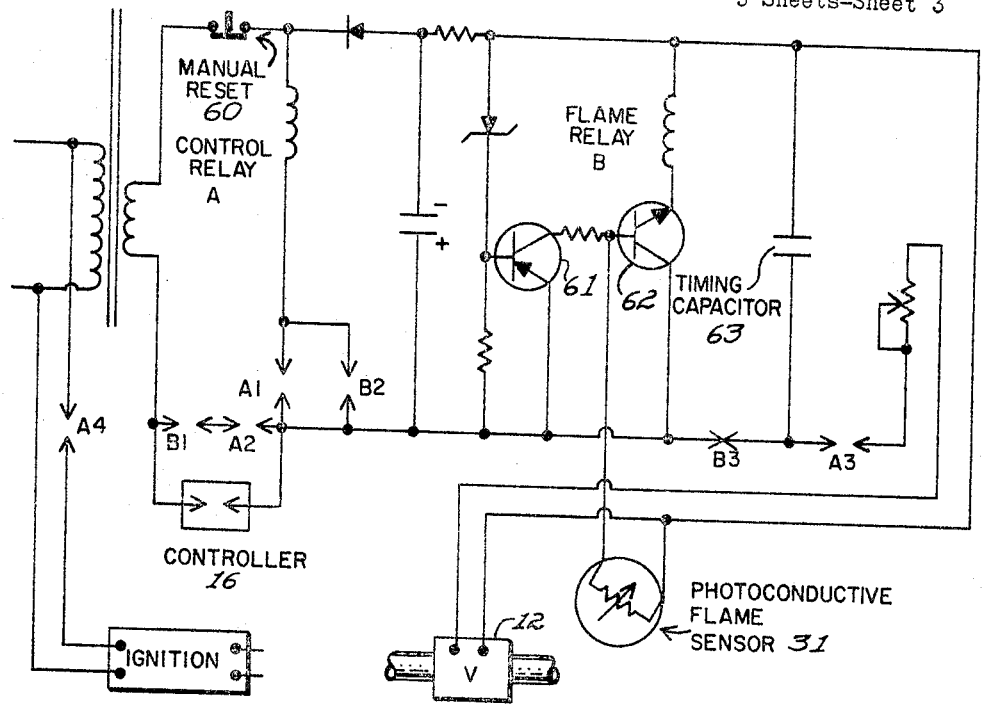
Figure 6:
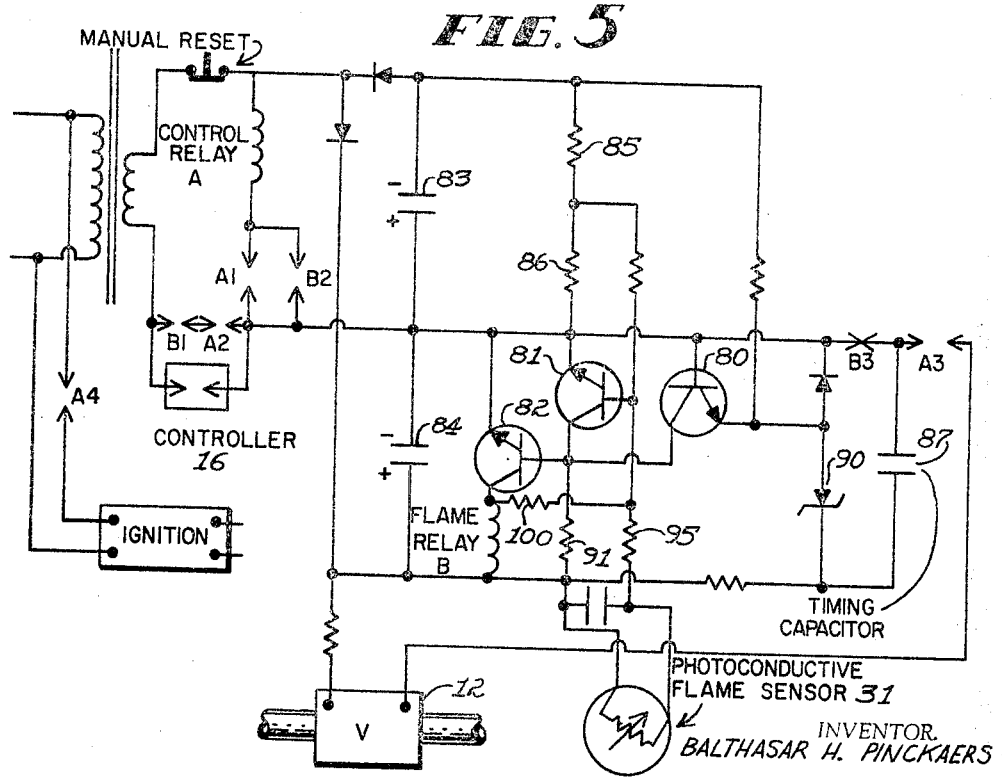

My invention will be apparent to those skilled in the art upon reference to the following specification, claims and drawings, of which:

FIGURE 1 is a schematic representation of a first embodiment of my invention showing a flame detector with a flame relay which is energized in the presence of flame, wherein a structure sensitive to timing capacitor charge is the control relay, FIGURE 2 is a schematic representation of a second embodiment of my invention, showing a flame detector with a flame relay de-energized in the presence of flame, and additionally showing a relay connected in circuit with a controller to facilitate proper controller current, as when the controller is a bimetal thermostat incorporating an anticipating heater, FIGURE 3 is a schematic representation of a third embodiment of my invention wherein the structure sensitive to charging of the timing capacitor is the flame relay, FIGURE 4 is the schematic representation of a fourth embodiment of my invention wherein a transistor is sensitive to the charging of the timing capacitor and a transistor is rendered non-conductive in the presence of flame, FIGURE 5 is a schematic representation of a fifth embodiment of my invention wherein a manual reset button, located at the fuel burner installation, must be actuated to reset the control apparatus from a safety lock-out condition, and FIGURE 6 is a schematic representation of a sixth embodiment of my invention wherein an improved transistor circuit is utilized.

Referring to FIGURE 1, reference numeral 10 designates generally a fuel burner installation having a fuel burner 11, a normally closed electrically energizable valve 12, an ignition transformer 13 adapted to provide spark ignition at electrode 14, and a flame sensor in the form of a flame rod 15 associated with the burner 10 to sense the presence or absence of flame at the burner.

Overall control of the apparatus is achieved by a switch controller 16 having a normally open switch 17. Controller 16 may be a push button type controller, or may be a condition sensitive controller such as a bimetal thermostat. Closing of switch 17 is indicative of the need for operation of a fuel burner installation 10.

The apparatus disclosed in FIGURE 1 incorporates a control relay A having switches A1, A2, A3, and A4, shown in the de-energized condition, that is with the winding of control relay A de-energized.

A flame relay B is provided and this flame relay includes the switches B1 and B2, shown in the de-energized condition, that is with the winding of flame relay B de-energized.

Operating voltage for the control apparatus is provided from a power transformer 18 having a high voltage primary winding 19, a low voltage secondary winding 20 and a high voltage secondary winding 21. Secondary winding 20 provides operating voltage for power supply capacitor 27 for control circuitry including control relay A and flame relay B whereas secondary winding 21 provides operating voltage for flame rod 15. Flame relay B is controlled by an electronic flame detector including transistors 22, 23, and 25. In the no-flame condition, transistor 22 is conductive and transistors 23 and 24 non-conductive, to maintain the winding of flame relay B de-energized. The presence of flame at burner 11 causes a capacitor 25 to be charged such that the righthand capacitor terminal is negative with respect to the lefthand terminal. This charge is distributed through a filter network 26 to the base and emitter electrodes of transistor 22 and, upon the presence of flame, transistor 22 is rendered and maintained non-conductive. With this transistor non-conductive, transistors 23 and 24 are rendered conductive and the winding of flame relay B is energized.

Reference numeral 28 identifies the above-described timing capacitor which is adapted to be charged from the source 27, and upon energization of control relay A, is directly connected to the electrically energizable actuator of valve 12 to open this valve and cause fuel to flow to the burner 11 until such time as the charge of capacitor 28 has been dissipated. As I have mentioned, if flame is established, the flame relay, by virtue of the switch B2, is effective to maintain the charge on this capacitor and to maintain the valve open.

Referring now to the operation of the apparatus of FIGURE 1, the apparatus is shown in the standby condition wherein power supply capacitor 27 is charged as indicated and wherein control relay A and flame relay B are de-energized. Furthermore, valve 12 is de-energized, ignition transformer 13 is de-energized, and flame is not present at burner 11.

A need for operation of the fuel burner installation 10 is evidenced by the closing of switch 16 of the controller. The closing of this switch is effective to establish an energizing circuit for the winding of control relay A which can be traced from the upper terminal of capacitor 27 through switch 17, flame relay switch B1, and the winding of control relay A to the lower terminal of capacitor 27.

Capacitor 28, now in its discharged condition, forms a shunt around winding of control relay A through switch A2 and prevents immediate energization of the winding. However, as timing capacitor 28 charges from power supply capacitor 27, the voltage present on capacitor 28 builds up to a value where the winding of control relay A is operatively energized. By virtue of this shunt circuit connection, control relay A becomes a means responsive to the state of charge of capacitor 28 and insures that the start up sequence of operation of the control apparatus is not instituted until a sufficient charge has been accumulated at capacitor 28. In this way, I am assured that a given quantity of energy is available at timing capacitor 28 to insure a given trial for ignition period.

Energization of control relay A causes holding switch A4 of the relay to close, this switch being connected in parallel with flame switch B1. Furthermore, the energization of control relay A causes switch A1 to close and thus complete an energization circuit for ignition transformer 13 to institute the presence of a spark between ignition electrode 14 and burner 11.

The opening of switch A2, upon energization of control relay A, disconnects the now charged capacitor 28 from the charging source (capacitor 27) and the closing of switch A3 connects the charged capacitor 28 to the electrically energizable actuator of valve 12. The valve now opens to allow fuel to flow to burner 11. The valve will remain open however only so long as sufficient charge remains at capacitor 28. Thus, fail safe operation of the ignition timing period is assured. It is impossible for 12 to remain operatively energized after timing capacitor 28 has been discharged below a given level.

Flame is normally now established at burner 11 and, as above-described, the rectification flame rod is effective to render transistor 22 non-conductive, thus causing transistors 23 and 24 to become conductive. As a result, the winding of flame relay B, which is connected in circuit with the emitter and collector electrodes of transistor 24, is operatively energized.

The closing of switch B2 establishes a circuit which again connects timing capacitor 28 to power supply capacitor 27 to thus maintain a charge at timing capacitor 28. A resistor 29 is provided in this circuit to limit the charge which can be accumulated on the timing capacitor 28 to a quantity of charge slightly below the quantity of charge accumulated when the timing capacitor is connected to the source 27 by way of the switch A2. Thus, on a subsequent flame failure, and the opening of switch B2, the timing achieved by discharge of capacitor 28 is again instituted and this timing is somewhat shorter than that which is achieved on initial start up of the control apparatus.

If a flame failure subsequently occurs, the apparatus will remain in a lock-out condition with control relay A energized and flame relay B and the valve de-energized and must be reset from this condition by the opening of switch 17 of the controller for a long enough time period to again institute a recharging of timing capacitor 28. Here again, my unique structure which utilizes means to check for proper charging of capacitor 28, is effective to prevent an immediate reenergization of the valve 12 until such time as the timing capacitor has received a given quantity of charge.

Referring to FIGURE 2, this embodiment of my invention utilizes a flame detector having a single transistor 30 connected in circuit with the winding of a flame relay B. Reference numeral 31 designates a photoconductive flame sensor having a high "dark" resistance and a low "light" resistance. Transistor 30 is controlled from photoconductive flame sensor 31 and is effective to energize flame relay B in the absence of flame. This action is reverse of the action of the construction of FIGURE 1 wherein flame relay B is de-energized in the absence of flame. Furthermore, power transformer 32 of FIGURE 2 is provided with a secondary winding 33 which is connected in circuit with a relay C and controller 16. With this construction it is possible to utilize a circuit including winding 33 and relay C such that the current passing through controller 16 may be designed to a desired value for purposes of heat anticipation, as when the controller is a bimetal operated thermostat sensitive to the temperature of an area to be heated by operation of the fuel burner installation 10.

The operation of the apparatus of FIGURE 2, and the manner in which the timing capacitor is charged, is much the same as described in connection with FIGURE 1. In the construction of FIGURE 2, I have provided a timing adjustment in the form of a rheostat 34 connected in series with the winding of control relay A. Here again, initial energization of control relay A is sensitive to the charge of the timing capacitor. Once the timing capacitor is charged, and control relay A is energized, the charged timing capacitor is connected in parallel with the operator of valve 12 to perform its timing function. If flame is successfully established, the flame relay switch B2 is closed and a charge is maintained on the timing capacitor.

In the circuit of FIGURE 1 the ignition transformer 13 is controlled by control relay A and thus is continuously energized so long as the controller 16 indicates the need for operation of the fuel burner installation. In the embodiment of FIGURE 2, the ignition transformer is controlled by the switch B3 of the flame relay. Thus, in the absence of flame the ignition transformer is energized. In this way, constant ignition may be provided as in FIGURE 1 or, interrupted ignition may be provided as in FIGURE 2.

In the embodiment of FIGURE 3 I again show a flame detector constructed and arranged to energize the winding of flame relay B in the absence of flame. However, in this construction timing capacitor 35 is connected in parallel with the winding of the flame relay, and thus the flame relay becomes the means sensitive to the state of charge of the timing capacitor. This can be readily understood by referring to the mode of operation of the apparatus of FIGURE 3.

Assume that controller 16 closes its switch to indicate a need for operation of the fuel burner installation; this switching action is effective to cause the power supply capacitors 36 and 37 to charge to the polarity indicated.

Operating voltage is then applied to transistor 38 and, in the absence of flame, the photoconductive flame sensor 31 is of a high impedance causing a base-to-emitter current to flow through this transistor. With this input signal, the transistor is rendered conductive and collector-to-emitter current flows through control relay switch A3 to charge timing capacitor 35. The voltage present on timing capacitor 35 is also the voltage present across the winding of flame relay B, thus, flame relay B is operatively energized only when a sufficient charge has been accumulated at timing capacitor 35.

When this charge has been accumulated, flame relay B is operatively energized and its switches B1 and B2 are actuated. The closing of switch B1 completes an energizing circuit for the winding of control relay A. The switch A1 of the control relay then closes to form a holding circuit for the winding of the control relay. The opening of switch A3, and the closing of switch A4, is effective to disconnect the now charged timing capacitor from its source of charging voltage (the flame detector) and to connect the charged capacitor as a sole source of operating voltage to the electrically energizable actuator of valve 12. With the flame relay energized, switch B2 is open and therefore no source of charging voltage is available for timing capacitor 35.

The quantity of electrical energy stored in the timing capacitor thus forms a means of positively and reliably timing the trial-for-ignition period for the fuel burner installation. Normally flame is established and is sensed by the photoconductive flame sensor 31, the impedance of this sensor lowering appreciably and becoming so low that the base-to-emitter circuit of transistor 38 is short circuited and little or no control current flows for this transistor. Thus, the collector-to-emitter current of the transistor is interrupted and the winding of flame relay B is operatively de-energized to indicate the presence of flame at the fuel burner installation. The de-energization of the flame relay causes switch B2 to close and to connect timing capacitor 35 through the switches B2 and A2 to the power supply capacitor 36. In this manner, a charge is maintained on the timing capacitor. Should flame subsequently fail, flame relay B2 is energized to disconnect the timing capacitor from the charging source and the short timing period for the closing of the valve is again instituted.

Referring now to the embodiment of FIGURE 4, in this embodiment I again disclose an electronic flame detector constructed and arranged to energize flame relay B in the absence of flame. However, I also provide a transistor, whose output electrodes are connected in circuit with the winding of flame relay B, and this transistor is connected to be sensitive to the state of charge of timing capacitor 40.

Reference numeral 41 identifies the transistor which is sensitive to the presence or absence of flame and reference numeral 42 identifies the transistor which is sensitive to the state of charge of timing capacitor 40. An understanding of the structure of FIGURE 4 can be achieved by again referring to the operation of the structure.

Assume that controller 16 closes its switch to indicate a need for operation of fuel burner installation 11. Closing of this switch causes the power supply capacitors 43 and 44 to be charged to the polarity indicated. The charge on capacitor 43 is applied across a voltage divider including resistors 45 and 46 to generate a turn-on bias current flowing from the emitter to the base of transistor 41. It will be noted at this point that photoconductive flame sensor 31 is at its high impedance no-flame condition.

The timing capacitor 40 is connected through switch B2 and through resistor 47 to the series connected power supply capacitors 43 and 44. By virtue of the fact that timing capacitor 40 is discharged at this time, zener diode 48 is not conductive and therefore a voltage is not present across resistor 49. Transistor 42 thereby remains non-conductive, and even though transistor 41 is conductive, the winding of flame relay B is not energized. However, as the charge on timing capacitor 40 increases, the voltage across the series connected resistor 49 and zener diode 48 increases to the point where zener diode 48 becomes conductive. Conduction of this element causes a voltage to be generated across resistor 49 to provide a forward bias current from the base to the emitter of transistor 42, rendering this transistor conductive. With this transistor conductive, an energizing current can flow through the winding of flame relay B to energize this winding. This energizing current can be traced through the emitter collector circuit of transistor 41, the winding of flame relay B, and the collector emitter circuit of transistor 42.

Energization of flame relay B causes switches B1 and B2 to be actuated. The closing of switch B1 completes an initial energizing circuit for the winding of control relay A. Energization of this winding causes switch A1 to close as a holding circuit for the winding.

The energization of flame relay B (in response to the absence of flame) causes switch B2 to open and thereby disconnect timing capacitor 40 from its source of charging voltage. The energization of the winding of control relay A, and the closing of switch A2, connects the now charged timing capacitor 40 through a timing adjustment potentiometer 50 to the electrically energizable actuator of valve 12, to institute opening of the valve and the beginning of the trial-for-ignition period.

Flame is normally established at the fuel burner installation and the photoconductive flame sensor 31 then "switches" to its low impedance state. By virtue of the low impedance of the flame sensor, a voltage from power supply capacitor 44 is developed across resistor 45 of such a polarity as to interrupt the emitter-to-base current of transistor 41 and thereby render the transistor non-conductive. Non-conduction of this transistor operatively de-energizes the winding of flame relay B and the switches B1 and B2 are actuated. The closing of switch B2 again connects timing capacitor 40 to its source of charging voltage to maintain a charge on the capacitor.

As I have discussed above, my invention utilizes the timing capacitor as the sole source of operating voltage for the fuel valve. I am aware that capacitor timing may be found in the prior art. However, the prior art structures of which I am aware utilizes the timing capacitor as a pilot source of energy to control other switching means, for example an electron discharge device which is connected in circuit with a further source of energy. It is this further source of energy, as controlled by the electron discharge device, which actually energizes an output such as the fuel valve. In such a construction the electron discharge device may become completely insensitive to the state of charge of the input capacitor and therefore maintains the output continuously energized such that timing actually is not provided as intended. My invention insures that a given timing will result by virtue of the fact that the construction of my invention is sensitive to the state of initial charge of the timing capacitor, and requires a given initial charge before operation of the apparatus can be instituted.

Referring to the embodiment disclosed in FIGURE 5, this embodiment utilizes much of the teaching of FIGURE 4, with the additional structure of a manual reset button 60 which cooperates with a control relay switch A2 and a flame relay switch B1 to provide a novel method of resetting the device from a lock-out condition.

In the structures disclosed in FIGURES 1 through 4, the lock-out condition of the apparatus, as instituted by a flame failure of a failure to initially establish flame, results in a condition wherein the controller 16 must be momentarily opened to reset the device from lock-out. It may be desired to prevent a resetting of the lock-out condition from the physical location of the controller. Usually a failure to establish flame, or a flame failure, indicates that some undesirable condition has occurred at the fuel burner installation. This undesirable condition may be a transitory condition which has now disappeared which would allow a safe restart of the installation. However, to insure that this is in fact true, it may be desirable to require an operator to reset the device from lock-out condition from the physical location of the fuel burner installation. With the embodiment of FIGURE 5, this can be achieved.

Normally, the components of the burner control apparatus, such as the photoconductive flame sensor 31, the control relay A, the flame relay B, and the transistors 61 and 62 are located at the vicinity of the fuel burner installation. As with the embodiment of FIGURE 4, the transistor 61 of FIGURE 5 is sensitive to the state of charge of timing capacitor 63 and the transistor 62 is sensitive to the presence or absence of flame. The presence of charge on timing capacitor 63 is effective to render transistor 61 conductive and thereby conditions transistor 62 to be rendered conductive. Transistor 62 is rendered conductive only in the event that photoconductive flame sensor 31 is at its high impedance state, indicating the absence of flame at the fuel burner installation. Energization of the winding of flame relay B closes switch B2 to energize the winding of control relay A, thus causes the holding switch A1 to be closed.

The closing of switch A3 and the opening of switch B3 connects the now charged timing capacitor to the electrically energizable actuator of valve 12 and disconnects the capacitor from its source of charging voltage. Flame is normally established to cause flame sensor 31 to assume its low impedance state. As a result, the base electrode of transistor 62 is effectively connected to the emitter electrode of this transistor and the transistor is rendered non-conductive to de-energize the winding of flame relay B. The de-energization of this winding closes switch B3 to again connect timing capacitor 63 to its source of operating voltage.

If it is assumed that a flame failure now occurs, photoconductive flame sensor 31 again assumes its high impedance state and as a result the base electrode of transistor 62 is connected through the emitter collector circuit of transistor 61 to a source of voltage rendering transistor 62 conductive. The winding of flame relay B is thus energized and its switches are actuated. The apparatus is now in the lock-out condition with both relays A and B energized.

Control relay A controls a switch A2 which is closed when relay A is energized and flame relay B controls a switch B1 which is closed when relay B is energized. The switches B1 and A2 are connected in series parallel with the switch of controller 16 and therefore, in the lock-out condition, the momentary opening of controller 16 is not effective to reset the apparatus from the lock-out condition. In order to reset, it is necessary that the manual reset switch 60 be momentarily opened, to cause the windings of relay A and relay B to be de-energized. When this has occurred, the manual reset switch 60 can be released. If the call for operation of the fuel burner installation 11 is still present a recycle will be instituted.

In the above described embodiments of my invention I have provided transistor circuits to control the energization of the flame relay. In FIGURE 6, I provide a snap acting type transistor switching circuit which renders the energization and de-energization of the flame relay primarily responsive to the impedance condition of the photoconductive flame sensor 31, and less sensitive to the characteristics of the flame relay itself, recognizing that relays of varying characteristics will be utilized due to the manufacturing tolerances involved.

The structure of FIGURE 6 is much the same as the above described structure of FIGURE 5, with the exception of the manner in which energization and de-energization of the winding of flame relay B is achieved. In the structure of FIGURE 6 I provide a transistor 80 which is responsive to the initial state of charge of the timing capacitor, a transistor 81 which is responsive to the impedance condition of the photoconductive flame sensor 31, and a transistor 82 which is connected to be controlled by the transistors 80 and 81 and which has the winding of the flame relay B connected to the output electrode thereof.

In FIGURE 6, two power supply capacitors 83 and 84 are provided. A voltage divider including resistors 85 and 86 is connected across power supply capacitor 83 whereas the timing capacitor 87 is connected to be charged from power supply capacitor 84. Upon closing of controller 16, timing capacitor 87 begins to charge. The voltage provided by power supply capacitor 83 across voltage divider 85 and 86 is such as to provide a forward biasing current for the base and emitter electrodes of transistor 80 and thus renders this transistor conductive. Conduction of this transistor maintains transistor 82 nonconductive, the current flow through resistor 91 now flowing through the collector to emitter circuit of transistor 80.

Since flame is not present at the fuel burner, photoconductive flame sensor 31 is at a high impedance state and transistor 81 is non-conductive by virtue of a reverse bias voltage developed across resistor 86.

As timing capacitor 87 charges, a voltage is reached at which Zener diode 90 conducts and develops a reverse bias to turn off transistor 80. With transistor 80 now non-conductive in response to capacitor charge, and with transistor 81 remaining non-conductive in response to the absence of flame, a forward biasing current flows from power supply capacitor 84 through resistor 91 to the base and emitter electrodes of transistor 82 to cause this transistor to become conductive. Conduction of this transistor, between its collector and emitter electrodes, energizes the winding of flame relay B and closes switch $B_2$ to energize the winding of control relay A. As above described in connection with FIGURE 5, the now charged timing capacitor 87 is connected to energize the electrically energizable actuator of valve 12. This institutes the trial-for-ignition period.

The opening of switch $B_3$ disconnects timing capacitor 87 from its charging source. Zener diode 90, now conductive, remains conductive to maintain transistor 80 non-conductive by virtue of the connection of the Zener diode to power supply capacitor 84 through a resistor.

When flame is established, within the short trial-for-ignition period, the flame is sensed by photoconductive flame sensor 31 and the impedance of the sensor is appreciably reduced. A forward biasing current for transistor 81 can now be traced from the positive terminal of power supply capacitor 84 through flame sensor 31, resistor 95 and the base to emitter circuit of transistor 81 to the negative terminal of capacitor 84.

Conduction of transistor 81 from the collector electrode to emitter electrode shorts the base-to-emitter circuit to transistor 82 and renders transistor 82 nonconductive to operatively and regeneratively de-energize the winding of flame relay B. This is a snap-acting circuit since when transistor 82 starts to turn off further forward biasing current for transistor 81 flows through positive feedback resistor 100. De-energization of this relay causes switch $B_3$ to close and connects the timing capacitor 87 to the source 84 to maintain a charge on this capacitor and to maintain valve 12 continuously energized.

From this description, it can be seen that in FIGURE 6, I have provided a transistor 82 which becomes conductive to energize flame relay B as an indication that transistor 81 is nonconductive, as it should be in the absence of flame, and as an indication that transistor 80 is non-conductive, as it will be when timing capacitor 87 is charged. When these conditions exist, transistor 82 is rendered conductive to initiate the trial-for-ignition period. During this period, if flame is successfully established at the burner, transistor 81 is rendered conductive to cause transistor 82 to become nonconductive and thereby to de-energize flame relay B. As I have mentioned, the specific arrangement of the transistors 80, 81, and 82 of FIGURE 6 provides accurate and predictable operation of the flame relay, independent of the variable characteristics to be found in production flame relays.

From the above description it can be seen that I have provided an improved burner control apparatus having improved means for controlling the timing for the trial-for-ignition period. Other modifications of my invention will be apparent to those skilled in the art and it is intended that the scope of my invention be limited by the scope of the appended claims.

I claim as my invention:

1. Burner control apparatus for use with a direct ignition fuel burner installation having electrically energizable fuel flow control means, comprising;
   a timing capacitor,
   means adapted to institute charging of said timing capacitor upon a need for operation of the burner installation,
   means responsive to a given charge being accumulated on said capacitor to interrupt the charging of said capacitor and to connect said capacitor to the electrically energizable fuel flow control means as the sole source of energizing voltage therefor,
   and means responsive to the establishment of flame at the burner installation to maintain the charge on said capacitor.

2. In a direct ignition burner control apparatus for use in controlling a gas burner having an electrically energizable normally closed fuel valve which admits gas to the gas burner when the valve is energized, and having ignition means to ignite gas flowing out of the gas burner, the control apparatus comprising;
   a flame detector having flame sensing means adapted to be subjected to the presence or absence of flame at the gas burner and having output switching means,
   control switching means having an electrically energizable actuator which is normally de-energized and is adapted to be energized upon a need for burner operation,
   a timing capacitor,
   first circuit means rendered effective upon a need for burner operation and controlled by said control switching means to connect said capacitor in parallel with the actuator of said control switching means and to a source of voltage when the actuator of said control switching means is de-energized, the actuator remaining de-energized until a given charge is accumulated on said capacitor, said first circuit means subsequently connecting said capacitor in parallel with the gas valve when the actuator is energized, whereupon the gas valve is energized for a trial for ignition time period whose length is determined by said given charge accumulated on said capacitor,
   and second circuit means controlled by said output switching means to connect said capacitor to a source of voltage upon flame being established at the burner within said trial for ignition time period, to thereby maintain a charge on said capacitor and to maintain energization of the gas valve.

3. A burner control apparatus for use with a fuel burner installation having a normally closed electrically energizable fuel valve controlling the flow of fuel to a burner and having ignition means associated with the burner, the control apparatus comprising;
   a timing capacitor,
   means controlled upon the occurrence of a need for operation of the burner installation to institute the charging of said capacitor,
   means effective upon a given charge being accumulated at said capacitor to interrupt the charging thereof and to connect said capacitor as a sole source of energizing voltage for the fuel valve, to thereby open the valve and institute a trial for ignition period as determined by a discharge time of said capacitor,
   flame detecting means adapted to sense the presence of flame at the burner,
   and means controlled by said flame detecting means and effective upon the establishment of flame to maintain a charge on said capacitor and thereby maintain fuel flow.

4. In a direct ignition burner control apparatus for use with a thermostat or the like to control a fuel burner having a normally closed valve which admits fuel to the burner when the valve is open, and having ignition means to ignite fuel flowing out of the burner, the control apparatus comprising;
   a flame detector having output switching means adapted to assume a first or a second state of operation dependent upon the absence or presence of flame at the burner,
   a capacitor,
   means adapted to be controlled by the thermostat and effective upon a need for operation of the fuel burner to connect said capacitor to a source of voltage to charge said capacitor,
   means responsive to a given charge on said capacitor to disconnect said capacitor from said source of voltage and to connect said capacitor as a sole source of electrical energy to electrical means operative to open the valve for a timed ignition period as determined by the discharge of said capacitor,
   and means controlled by said output switching means in said second state of operation to maintain a charge on said capacitor in response to the establishment of flame at the burner.

5. Direct ignition burner control apparatus for use with a fuel burner having a normally closed valve and ignition means, comprising;
   a control relay having a winding and switch means controlled thereby,
   a timing capacitor,
   circuit means controlled by the switch means of said control relay and effective when the winding of said control relay is de-energized to connect said timing capacitor in parallel with the winding of said control relay, and effective when the winding of said control relay is energized to connect said timing capacitor to the valve,
   circuit means effective upon the need for operation of the fuel burner adapted to connect the winding of said control relay to a source of operating voltage whereupon operative energization of the winding of said control relay occurs after a given charge has been accumulated on said timing capacitor,
   and flame detecting means including means including switch means effective upon the successful establishment of flame at the fuel burner during the discharge trial for ignition time period of said capacitor to maintain a charge on said capacitor.

6. Direct ignition burner control apparatus for use with a fuel burner having ignition means and a normally closed fuel valve to provide a short trial for ignition period, comprising:
   a control relay having an actuator and switch means controlled thereby,
   a flame detector including means adapted to be subjected to the presence or absence of flame at the fuel burner and including a flame relay having an actuator and switch means controlled thereby, said flame detector being constructed and arranged to energize the actuator of said flame relay in the absence of flame,
   a timing capacitor,
   circuit means controlled upon the need for operation of the fuel burner adapted to institute charging of said timing capacitor,
   means including the actuator of said flame relay rendering said flame relay sensitive to the state of charge of said timing capacitor to cause the actuator of said flame relay to be operatively energized in the absence of flame after a given charge has been accumulated on said timing capacitor,
   energizing circuit means to energize the actuator of said control relay upon energization of the actuator of said flame relay and including holding switch means of said control relay to hold the actuator of said control relay energized,
   circuit means controlled by said control relay when energized interrupting charging of said timing capacitor and connecting said timing capacitor as a sole source of operating voltage to the fuel valve to cause the valve to open and begin a trial for ignition period, and circuit means controlled by the switch means of said flame relay when de-energized connecting said timing capacitor to a source of voltage to maintain the fuel valve open.

7. Burner control apparatus for use with a fuel burner having spark ignition means and having a normally closed electrically energizable valve, comprising;

a control relay having a winding, normally closed switch means and normally open switch means, a flame detector having a transistor the input electrodes of which are connected to means adapted to be subjected to the presence or absence of flame at the fuel burner and the output electrodes of which are connected to the winding of a flame relay having normally closed switch means and normally open switch means, said flame detector being constructed and arranged to energize the winding of said flame relay in the absence of flame at the fuel burner, a timing capacitor to time a trial-for-ignition period for the fuel burner, circuit means under the control of means responsive to the need for operation of the fuel burner and arranged to apply operating voltage to said transistor through the winding of said flame relay upon such a need, circuit means including normally closed switch means of said control relay connecting said timing capacitor in parallel with the winding of said flame relay to prevent the operative energization of said winding until such time as said timing capacitor has accumulated a given quantity of electrical energy, initial energizing circuit means for the winding of said control relay including normally open switch means of said flame relay, holding circuit means for the winding of said control relay including normally open switch means of said control relay, circuit means controlled by normally open switch means of said control relay adapted to connect said timing capacitor to the electrically energizable valve, and switch means including in series circuit normally open switch means of said control relay and normally closed switch means of said flame relay adapted to connect said timing capacitor to a source of charging voltage to maintain the valve open so long as there is a continued need for operation of the fuel burner and so long as said flame detector detects the presence of flame.

8. Direct ignition burner control apparatus for use with a fuel burner having spark ignition means and having a normally closed electrically energizable valve to control the flow of fuel to the burner, the apparatus comprising;

a timing capacitor, a first transistor having input electrodes interconnected to said timing capacitor to render said first transistor conductive only upon the presence of a given electrical charge at said timing capacitor, a second transistor having input electrodes interconnected with flame sensing means to render said second transistor conductive only upon the absence of flame at the fuel burner, a flame relay having a winding and switch means, circuit means interconnecting the output electrodes of said first and second transistors with the winding of said flame relay to energize said flame relay upon said timing capacitor accumulating said given charge and upon the absence of flame at the fuel burner, a control relay having a winding and switch means, energizing circuit means to energize the winding of said control relay upon energization of the winding of said flame relay, holding means controlled by the switch means of said control relay to maintain the winding thereof energized, circuit means controlled by the switch means of said flame relay effective to disconnect said timing capacitor from a source of charging voltage and to connect said capacitor as a sole source of energizing voltage to the electrically energizable valve to open the valve for a trial-for-ignition period as determined by the discharge time of said timing capacitor, and further circuit means controlled by the switch means of said flame relay to maintain a charge on said timing capacitor upon the establishment of ignition at the fuel burner during the trial-for-ignition period.

9. Direct ignition burner control apparatus for use with a fuel burner having a spark ignition means and having a normally closed electrically energizable valve to control the flow of fuel to the burner, the apparatus comprising;

a timing capacitor, a first transistor having input electrodes interconnected to said timing capacitor to render said first transistor non-conductive upon the presence of a given electrical charge at said timing capacitor, a second transistor having input electrodes interconnected with flame sensing means to render said second transistor non-conductive upon the absence of flame at the fuel burner, a third transistor having input electrodes interconnected with said first and second transistors to render said third transistor conductive upon each of said first and second transistors being non-conductive, a flame relay having a winding and switch means, circuit means interconnecting the output electrodes of said third transistor with the winding of said flame relay to energize said flame relay upon said timing capacitor accumulating said given charge and upon the absence of flame at the fuel burner, a control relay having a winding and switch means, energizing circuit means to energize the winding of said control relay upon energization of said flame relay, holding means controlled by the switch means of said control relay to maintain the winding thereof energized, circuit means controlled by the switch means of said flame relay effective to disconnect said timing capacitor from a source of charging voltage and to connect said capacitor as a sole source of energizing voltage to the electrically energizable valve to open the valve for a trial-for-ignition period as determined by the discharge time of said timing capacitor, and further circuit means controlled by the switch means of said flame relay to maintain a charge on said timing capacitor upon the establishment of ignition at the fuel burner during the trial-for-ignition period.

References Cited by the Examiner

UNITED STATES PATENTS 2,747,112   5/1956   Deziel et al. _____ 158—289 X

FREDERICK KETTERER, *Primary Examiner.*